United States Patent [19]

Pinnow et al.

[11] 4,451,116

[45] May 29, 1984

[54] INFRARED TRANSMITTING FIBER OPTICAL WAVEGUIDE EXTRUDED FROM HALIDES OF THE METAL THALLIUM AND THE METHOD OF PREPARATION

[75] Inventors: Douglas A. Pinnow, Wallingford, Conn.; Anthony L. Gentile, Thousand Oaks, Calif.; Arlie G. Standlee, Thousand Oaks, Calif.; Arthur J. Timper, Torrance, Calif.

[73] Assignee: Hughes Aircraft Company, El Segundo, Calif.

[21] Appl. No.: 230,923

[22] Filed: Feb. 2, 1981

Related U.S. Application Data

[63] Continuation of Ser. No. 37,581, May 9, 1979, abandoned, which is a continuation of Ser. No. 800,149, May 24, 1977, abandoned.

[51] Int. Cl.³ .................... G02B 5/14; C03B 37/025; C03B 37/075
[52] U.S. Cl. .................... 350/96.34; 65/2; 65/4.2; 264/319; 350/96.29
[58] Field of Search ............... 264/176 F, 319; 65/2, 65/4.2, 13; 350/1.1, 1.3, 1.4, 96.30, 96.29, 96.34

[56] References Cited

U.S. PATENT DOCUMENTS

| | | | |
|---|---|---|---|
| 1,536,821 | 5/1925 | Devers | 65/2 |
| 1,579,019 | 3/1926 | Miller | 65/2 |
| 2,986,527 | 5/1961 | Baum et al. | 252/300 |
| 3,551,051 | 12/1970 | Salgo | 356/51 |
| 3,674,330 | 7/1972 | Strong | 350/2 |
| 3,843,865 | 10/1974 | Nath et al. | 219/121 L |

OTHER PUBLICATIONS

L. L. Blyler et al; Low-Loss, Polymer-Clad Silica Fibers Produced by Laser Drawing: Jan. 1975; Optical Fiber Transmission Conf., Williamsburg, Va.

Pontarelli & Kapany; Infrared Fiber Optics; Annual Meeting Journal of the Optical Society of America; Nov. 1960; vol. 50, No. 11; Abstract Only.

Kapany; Fiber Optics; Fiber Optics; Academic Press; New York; 1967; pp. 271-273.

Toshi Nakatsubo; Fiber Optics; Instrumentation; vol. 14, No. 3; p. 57; May 1971; Kogyo Gijutsu Co.; Tokyo, Japan.

G. Tangonan, A. C. Paster, R. C. Pasto; Single Crystal KCl Fibers for 10.6 μm Integrated Optics; Applied Optics, vol. 12, No. 6; pp. 1110 and 1111; Jun. 1973.

Kazuyoshi Nagao; Optical Fiber; Optical Engineering, Series 2; pp. 67, 71 and 107; Apr. 10, 1974; Kyoritsu Printing Co.; Tokyo, Japan.

Keiei Kudo; Tables of Fundamental Physical Properties Based on Spectroscopic Properties; pp. 151 & 156; May 15, 1972; Kyoritsu Publishing Co., Ltd.; Tokyo, Japan.

Perry Miles; High Transparency Infrared Materials-A Technology Update; Optical Engineering, Sep.-Oct. 1976; vol. 15, No. 5, pp. 451-459.

Optical Engineering Handbook; Edited by Hiroshi Kubota et al; Oct. 25, 1968, pp. 675 and 676; Asakura Shoten Co., Ltd., Tokyo, Japan.

R. J. Stokes and C. H. Li; Dislocations and the Strength of Polycrystalline Materials; Honeywell Research Center; Hopkins, Minnesota; Undated.

Armour Research Foundation, Final Report, ARF 1139-11; Infrared Fiber Optics; Dec. 14, 1961; pp. 1, 8, 10, 12, 14, 28; Contract No. AF (616)-6247; Wright Air Development Div.; Wright-Patterson Air Force Base; Dayton, Ohio.

*Primary Examiner*—Robert L. Lindsay, Jr.
*Attorney, Agent, or Firm*—E. F. Oberheim; A. W. Karambelas

[57] ABSTRACT

There is disclosed a fiber optic waveguide which is particularly suited for infrared radiation transmission at extended wavelengths. The core of the waveguide is fabricated from heavy ionic compounds selected from metal halides in order to achieve such extended infrared transparency. While it is impossible to prepare these materials into optical fibers using conventional fiber drawing techniques, the present invention teaches how such materials may be prepared into optical fibers using an extrusion process at elevated temperatures and high pressures.

4 Claims, 3 Drawing Figures

Fig. 1.
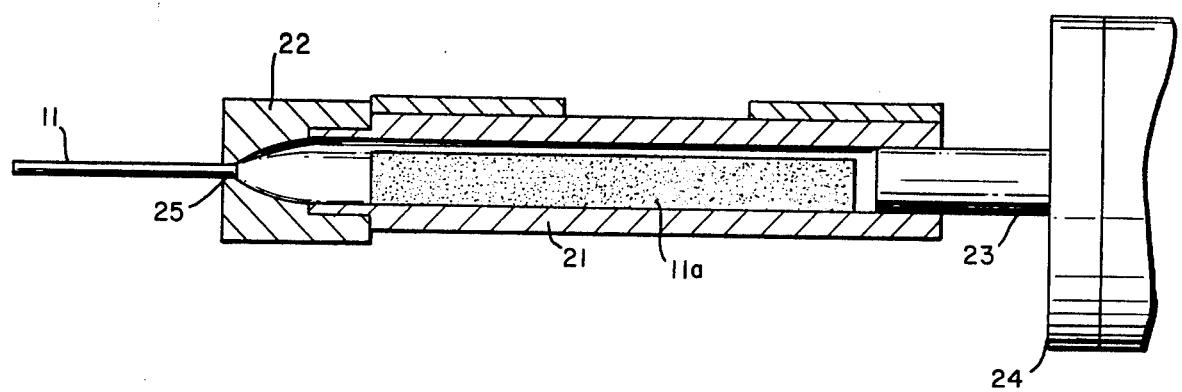
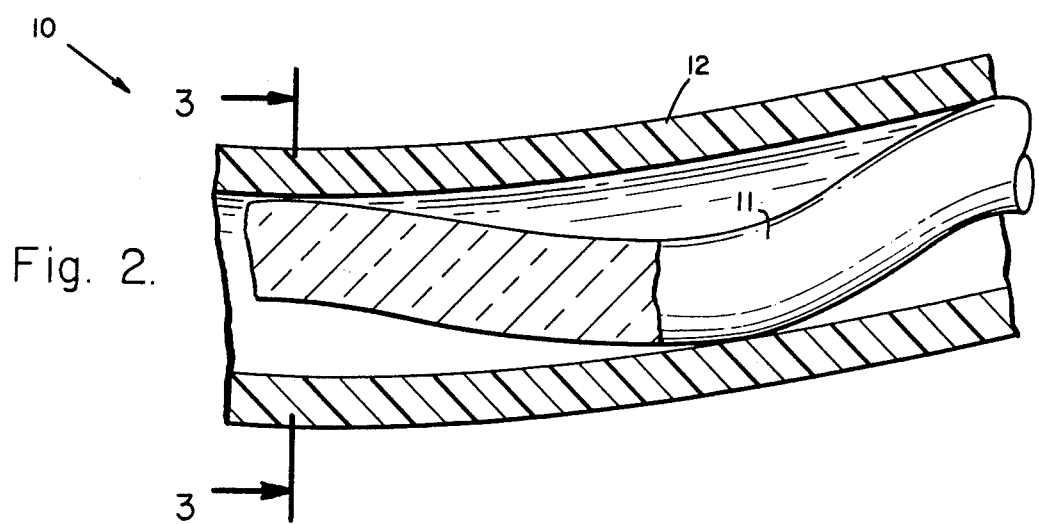
Fig. 2.
Fig. 3.
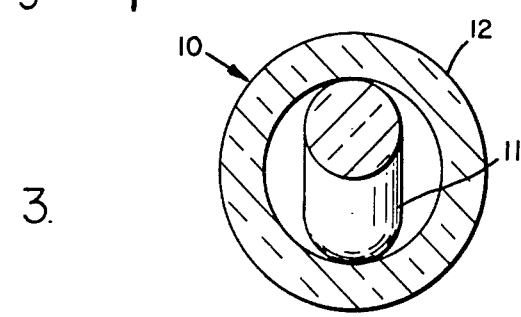

INFRARED TRANSMITTING FIBER OPTICAL WAVEGUIDE EXTRUDED FROM HALIDES OF THE METAL THALLIUM AND THE METHOD OF PREPARATION

The Government has rights in this invention pursuant to Contract No. DAHC60-73-C-0090 awarded by the Department of the Army.

This is a continuation of application Ser. No. 037,581, filed May 9, 1979, now abandoned, which was a continuation of parent application Ser. No. 800,149, filed on May 24, 1977, now abandoned.

BACKGROUND OF THE INVENTION

This invention pertains to the field of fiber optical waveguides and more particularly to such waveguides which require extended transmission to infrared wavelengths of 10.6 micrometers and beyond. The best fiber optical waveguides previously available were made from $As_2Se_3$ glass and had infrared cut-offs in the range of 12 micrometers. The present invention extends this range of transparency to approximately 35 micrometers.

A considerable amount of work has been conducted at almost every major research center throughout the world on low loss oxidic glass fiber optical waveguides. These waveguides have been prepared with extremely low transmission losses in the range of 1 dB/km. Their range of infrared transparency extends out to 4 or 5 micrometers. Non-oxidic fibers made from $As_2S_3$ and compounds of As, S, Se, and Te have been reported by Kapany in his book "Fiber Optics", Academic Press, 1967, pp. 273-274 and have been recently prepared by workers at Arthur D. Little. The transparencyof these chalcogenide fibers extends out to approximately 12 micrometers. However, their absorption at 10 micrometer and longer is considerably greater than $10^{-2}$ inverse centimeters and hence their applications are limited. This is not the case for the waveguide of the present invention. For a further discussion of the general field of fiber optics techology, reference is also made to a book edited by Michael K. Barnoski and published in 1976 by Academic Press entitled "Fundamentals of Optical Fiber Communications".

SUMMARY OF THE INVENTION

Analysis of the characteristics of available materials indicated that the preferred materials for extended infrared transmission are the heavy ionic compounds such as thallium bromide (TlBr) and thallium bromoiodide ($TlBr_xI_{1-x}$). Attempts to prepare these materials into optical fibers using conventional fiber drawing techniques were not successful. Such techniques are apparently not applicable to these materials. However, it has been discovered that it is possible to extrude these materials into fibers at elevated temperatures and high pressures and that these fibers may be fabricated to and will perform as radiation waveguides as extended infrared wavelengths.

BRIEF DESCRIPTION OF THE DRAWINGS

These and other features, objects, and advantages of the invention will be more fully apparent from the detailed description below taken in connection with the accompanying drawings wherein like reference characters refer to like parts throughout and in which:

FIG. 1 is a diagrammatic view of extrusion apparatus suitable for use in the process of fabricating the waveguide of the present invention.

FIG. 2 is a longitudinal sectional view along a length of fiber optic waveguide prepared in accordance with the present invention.

FIG. 3 is a cross-sectional view taken on line 3—3 of FIG. 2

DETAILED DESCRIPTION OF THE DRAWINGS

There is shown in FIGS. 2 and 3 a new type of fiber optical waveguide 10 which has infrared transparency and efficient transmission extending to wavelengths well beyond those transmitted by known glassy materials. This new type of fiber optical waveguide has been prepared with polycrystalline cores 11 of a metal halide such as thallium bromide, thallium bromoiodide (KRS-5), silver chloride, or an alkali halide by an extrusion process. To complete the waveguide, the polycrystalline cores are inserted into a loose fitting polymer cladding 12 which serves both as a means for optical confinement of the guided radiation modes in the core and as mechanical protection for the crystalline cores. This general type of polymer clad fiber using silica cores has been discussed in a paper entitled "Low-Loss, Polymer-Clad Silica Fibers Produced by Laser Drawing" by L. L. Blyler, Jr. et al, published under the title "Optical Fiber Transmission" which is a Digest of Technical Papers presented at the "Topical Meeting on Optical Fiber Transmission", Jan. 7-9, 1975, Williamsburg, Va., copyrighted 1975 by the Optical Society of America. As disclosed therein, the polymer cladding may, for example, consist of Teflon.

The optical transparency of the fibers 10 extends from approximately 0.6 micrometers in the visible to approximately 35 micrometers in the infrared. By comparison, the conventional oxidic glass fibers have infrared cut-offs in the range of 4 or 5 micrometers and the less conventional arsenic trisulfide and arsenic triselenide glass fibers have cut-offs in the range of 8 to 12 micrometers, respectively.

Potential application for the new polycrystalline fibers include dissection of focal plane arrays for enhanced detection and signal processing, the relay of focal planes to remote photodetectors, flexible transmission of high power CO and $CO_2$ laser beams for heating and machining in remote or unaccessible locations, and extremely low loss guided communications links. The application to low loss communiction links requires considerable care in waveguide design and material verification. The losses of such fibers, when prepared with ultra high purity materials, would appear to be orders of magnitude less than those of the best low loss glass fibers presently available which have demonstrated losses of approximately 1 dB/km at 1.06 micrometers.

In FIG. 1, there is shown a diagram of the extrusion apparatus used to prepare the cores 11 of waveguide 10. This extrusion apparatus comprises barrel 21 into which a material charge 11a is placed. This barrel 21 leads to an extrusion die 22 at one end thereof. A ram 23 is driven by any suitable drive means 24 so as to be movable along the axial length within the barrel 21 down to the extrusion die 22.

The diameter of the orifice 25 in the extrusion die is such that the present polycrystalline fibers have been prepared with core diametes in the range of 100 to 500 micrometers. The extrusion temperatures for KRS-5 ranged from 200° to 350° C. (which is below the 414° C. melting point of KRS-5) and the extrusion rates were approximately several centimeters per minute. The waveguides were made from commercially available materials and their losses are limited both by impurity absorption and by scattering from waveguide imperfections. Total absorption losses of less than $10^{-2}$ inverse centimeter and even as low as of 10% per meter or $10^{-3}$ inverse centimeters have been observed at 10.6 micrometers and a 2 watt continuous $CO_2$ laser beam has been transmitted through a test fiber without degradation. The KRS-5 fibers possess remarkable "plastic"-like properties in the temperature range of 250' to 350° C. In this range the fibers can be bent into almost any arbitrary configuration which can be permanently set when the fiber is cooled back to ambient temperature. The mechanical characteristics of the thallium bromide fibers are much different. Their temperature range of plasticity extends below room temperature and these fibers are extremely flexible at the ambient temperatures.

Generally speaking, the cores for these fibers can be prepared from halides of metals from Group IA of the Periodic Table of the Elements which are the alkali metals lithium, sodium, potassium, rubidium, cesium and francium; or metals from Group IB which are copper, silver or gold; or metals from Group IIIA which are aluminum, gallium, indium and thallium. Finally, a "halide" is "a binary chemical compound of a halogen with a more electro-positive element or group" and in turn a "halogen" is "any of a group of five chemically related non-metallic elements of Group VIIA that includes flourine, chlorine, bromine, iodine and astatine." These commonly accepted definitions are what is meant by the terms herein.

The polymers which are suitable for the cladding 12 include Teflon, polyethylene, Saran, Hytrel polyesters, polyamides, Elvax, Surlyn, Kynar and the like.

What is claimed is:

1. The method of making an optical fiber from thallium bromoiodide, comprising the steps of:

heating a quantity of thallium bromoiodide to a temperature which is in the range of 200° C. to 350° C.; and extruding an optical fiber from said heated material.

2. The method of making an optical fiber from thallium bromoiodide, comprising the steps of:

heating a quantity of thallium bromoiodide to a temperature which is in the range of 200° C. to 350° C.; and extruding an optical fiber from said heated material at a rate of several centimeters per minute.

3. As a new article of manufacture, an optical fiber of thallium bromoiodide which is extruded in the presence of heat in the range of 200° C. to 350° C.

4. As a new article of manufacture, an optical fiber of thallium bromoiodide which is extruded in the presence of heat in the range of 200° C. to 350° C. at a rate of several centimeters per minute.

* * * * *